United States Patent
Fledersbacher et al.

(10) Patent No.: US 6,739,134 B2
(45) Date of Patent: May 25, 2004

(54) EXHAUST GAS TURBOCHARGER FOR AN INTERNAL COMBUSTION ENGINE

(75) Inventors: Peter Fledersbacher, Stuttgart (DE); Siegfried Sumser, Stuttgart (DE); Paul Loeffler, Stuttgart (DE); Helmut Finger, Le.-Echterdingen (DE); Hans-Josef Hemer, Worms (DE); Ralf Koch, Ruessingen (DE)

(73) Assignees: DaimlerChrysler AG, Stuttgart (DE); 3-K Warner Turbosystems GmbH, Kirchheimbolanden (DE)

( * ) Notice: Subject to any disclaimer, the term of this patent is extended or adjusted under 35 U.S.C. 154(b) by 0 days.

(21) Appl. No.: 10/311,128

(22) PCT Filed: Jun. 13, 2001

(86) PCT No.: PCT/EP01/06681

§ 371 (c)(1),
(2), (4) Date: Apr. 11, 2003

(87) PCT Pub. No.: WO01/96713

PCT Pub. Date: Dec. 20, 2001

(65) Prior Publication Data

US 2003/0150211 A1 Aug. 14, 2003

(30) Foreign Application Priority Data

Jun. 15, 2000 (DE) .......................................... 100 29 640

(51) Int. Cl.[7] .............................................. F02D 23/00
(52) U.S. Cl. .................... 60/602; 417/407; 415/157; 415/158
(58) Field of Search ........................... 60/602; 417/407; 415/157, 158, 117

(56) References Cited

U.S. PATENT DOCUMENTS

| 4,642,026 A | 2/1987 | Ruff |
| 5,454,225 A | 10/1995 | Sumser et al. ................ 60/602 |
| 5,868,552 A | 2/1999 | McKean et al. |
| 6,050,775 A | 4/2000 | Erdmann et al. |

FOREIGN PATENT DOCUMENTS

| DE | 35 41 508 | 2/1987 | |
| DE | 39 41 399 | 1/1991 | |
| DE | 43 30 487 | 1/1995 | .................. 60/602 |
| DE | 196 15 237 | 10/1997 | .................. 60/602 |
| DE | 197 52 534 | 10/1998 | |
| DE | 198 38 754 | 3/2000 | .................. 60/602 |

*Primary Examiner*—Thomas Denion
*Assistant Examiner*—Thai-Ba Trieu
(74) *Attorney, Agent, or Firm*—Kenyon & Kenyon

(57) ABSTRACT

An exhaust-gas turbocharger for an internal combustion engine has a turbine in the exhaust-gas tract and a compressor, driven by the turbine, in the intake tract, the turbine having a flow channel with a radial flow-inlet cross-section and a semi-axial flow-inlet cross-section, and a flow ring being provided which limits the two flow-inlet cross-sections. The turbine is furnished with variable turbine geometry for the changeable adjustment of the flow-inlet cross-section. To improve efficiency, the position of the flow ring in the housing of the exhaust-gas turbocharger is variably adjustable.

14 Claims, 2 Drawing Sheets

EXHAUST GAS TURBOCHARGER FOR AN INTERNAL COMBUSTION ENGINE

FIELD OF THE INVENTION

The present invention relates to an exhaust-gas turbocharger for an internal combustion engine.

BACKGROUND INFORMATION

An exhaust-gas turbocharger having a turbine with radial and semi-axial flow-inlet cross-sections in the inflow region of the turbine is described in German Published Patent Application No. 196 15 237. The flow-inlet cross-sections, between which a flow or guide ring, contoured in a manner favorable for the flow, is arranged in the flow-in region of the turbine, permit both a radial and a semi-axial flow against the turbine wheel. Disposed in the radial flow-inlet cross-section is a guide baffle having adjustable guide vanes by which the flow-inlet cross-section can be varied. The exhaust-gas backpressure, as well as the manner in which the exhaust gas flows in onto the turbine wheel can be influenced by the setting of the guide baffle, which means the output of the turbine and the performance of the compressor can be adjusted depending on the requirement and the operating state of the internal combustion engine.

Such exhaust-gas turbochargers, equipped with variable turbine geometry, are also used in particular in the overrun condition of the internal combustion engine. In overrun condition, the guide baffle is transferred into a damming or blocking position in which the inlet cross-section is markedly reduced, whereupon an increased exhaust-gas backpressure builds up in the line section upstream of the turbine, with the result that the exhaust gas flows with high speed through the channels between the guide vanes and the turbine wheel is acted upon with a high pulse. Due to the increased supercharger output, the combustion air supplied to the engine is also placed under an increased charge-air or boost pressure. Increased charge-air pressure acts upon the cylinder on the intake side. At the same time, an increased exhaust-gas backpressure is applied on the outlet side which counteracts the blow-off of the air compressed in the cylinder via brake valves into the exhaust-gas tract. In engine braking or exhaust braking operation, the piston in the compression stroke and exhaust stroke must perform compression work against the high overpressure in the exhaust-gas tract. A strong braking action is achieved by this means.

The desired high braking power can only be achieved, however, if a desired pressure distribution prevails within the turbine, and the exhaust gas flows through the turbine in the manner provided. Problematic in this context is, in particular, incorrect air flow which can occur owing to component and manufacturing tolerances, as well as due to wear and tear and heat-caused expansion, and which can severely impair a setpoint pressure characteristic within the turbine which has a negative effect not only on the engine braking performance, but also on the engine performance in the functioning drive operating mode. However, incorrect air flow can also develop through gaps which are subject to design and which are necessary for the movement of the guide vanes of the guide baffle of the variable turbine geometry in one of the flow-inlet cross-sections.

It is an object of the present invention to increase the efficiency of exhaust-gas turbines having variable turbine geometry. It is another object of the present invention to improve the supercharger performance particularly in engine braking operation, but also possibly in the functioning drive operating mode.

SUMMARY

According to the exhaust-gas turbocharger of the present invention, the position of the flow ring in the housing of the supercharger may be variably adjusted. Conventionally, this flow ring is always constructed as a member fixedly joined to the supercharger housing, whereas according to the present invention, the flow ring is arranged to be movable. This provides the possibility that gap dimensions which are dependent on design or develop due to wear and tear, heat expansion or other causes may be reduced and possibly completely eliminated by a movement of the flow ring. Incorrect air flow may be largely or completely eliminated. Within the turbine, a desired pressure distribution may be adjusted which produces a desired flow of exhaust gas onto the turbine wheel. For example, when working with semi-axial/radial combination turbines, it is possible to construct a guide baffle, arranged in the semi-axial flow-inlet cross-section, with stationary vanes, and to configure this semi-axial guide baffle especially for the requirements in engine braking operation. In this construction, the aim is to reduce the radial flow-inlet cross-section to the greatest extent possible in engine braking operation, i.e., to close the radial guide baffle. However, in order to be able to adjust the radial guide vanes, a minimum gap may be necessary at the axial end faces of the radial guide vanes. To adjust the radial guide vanes, the adjustable flow ring may be shifted into a position further distant from the radial guide baffle. To close air gaps, the flow ring is subsequently pushed until contact at the end face of the radial guide vanes or of another structural element of the radial guide baffle.

The flow ring may be configured to be axially displaceable, thereby making it possible in particular to reduce guide-vane gaps at the radial guide baffle. Alternatively or in addition, however, it may also be possible to provide radial adjustability of the flow ring which may be attained, for example, by an eccentric shift of the flow ring and/or by a radial widening or tapering of the flow ring.

In the case of an axially displaceable flow ring, the shifting movement may be limited by stops which, in particular, limit the opening of a guide-vane gap of the radial guide baffle to a predefined dimension. This permitted axial path, which may be identical with the axial play of the flow ring, may be approximately 0.15 mm to 0.3 mm. This comparatively small dimension is intended to ensure that in the event of a malfunction, for example, in the event a control element adjusting the flow ring fails, the maximum play of the flow ring is limited to a dimension which may ensure functioning of the exhaust-gas turbocharger both in engine braking operation and in functioning drive operating mode.

In the case of a radial guide baffle having adjustable guide vanes, they may be supported, in each case via an axial shaft, not only on the supercharger housing, but also, e.g., in the displaceable flow ring. In the case of a double-sided support of the guide vanes which is provided in the flow ring as well, recesses may be provided in the flow ring to receive the allocated vane shaft, the depth of the recesses being, e.g., adapted to the axial length of the vane shafts in order to be able to accommodate the vane shafts even in the event the guide-vane gap is completely closed.

Optionally, it may also be possible in certain operating states of the internal combustion engine in the engine braking operation and/or in the functioning drive operating mode to provide a desired gap dimension with which the flow ratio and compression ratio within the supercharger housing in the turbine may be purposefully influenced in a specific manner. Furthermore, it may be possible to provide additional criteria for the adjustment of the flow ring, e.g., such that the flow-inlet cross-section for the radial and/or the semi-axial inflow may not exceed a maximum.

Further aspects and example embodiments of the present invention may be gathered from the figures and the following description.

DETAILED DESCRIPTION

Figure 1:
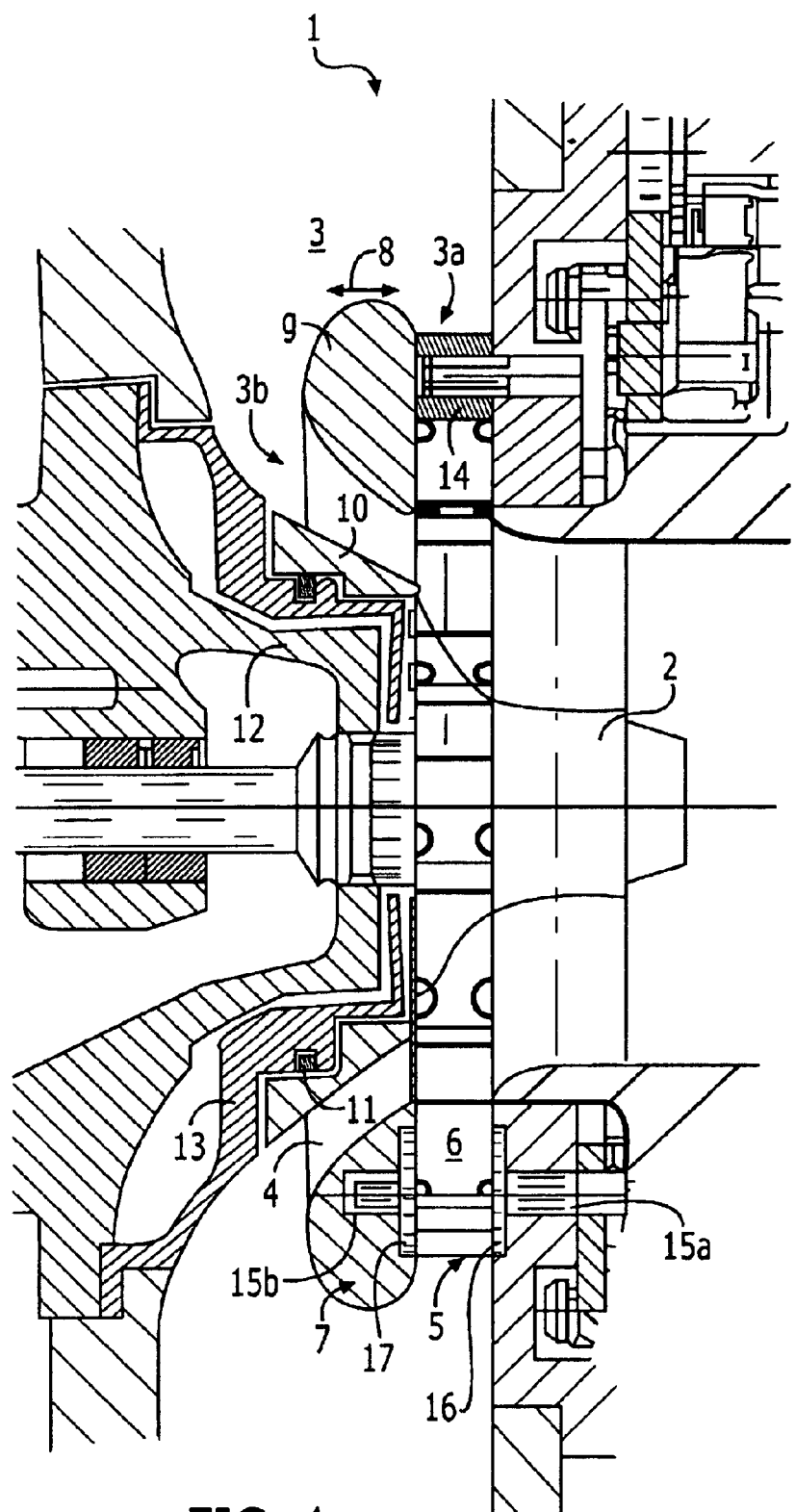
FIG. 1 is a cross-sectional view through a turbine of an exhaust-gas turbocharger having variable turbine geometry and axially adjustable flow or guide ring.
Figure 2:
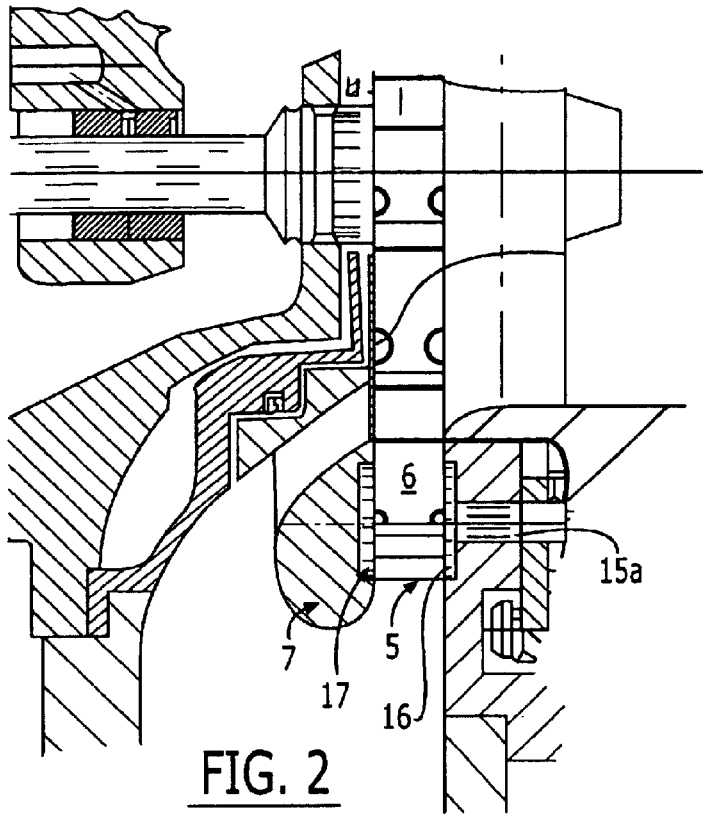
FIG. 2 is a cross-sectional view corresponding to FIG. 1, however with one modification in the region of the radial guide baffle.
Figure 3:
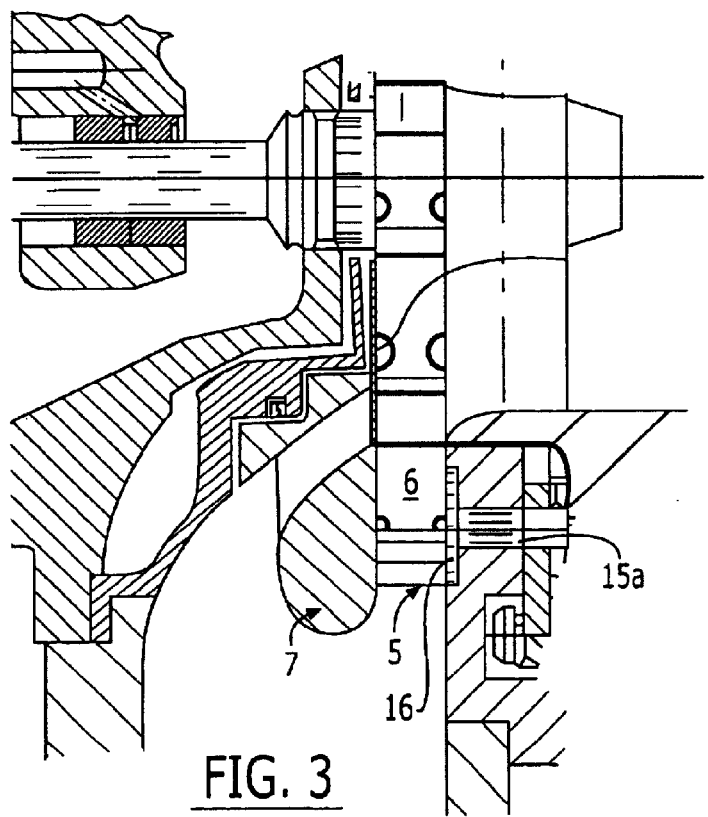
FIG. 3 is a cross-sectional view corresponding to FIGS. 1 and 2, respectively, however with a further modification in the region of the radial guide baffle.

Identical components are provided with identical reference numerals in the exemplary embodiments illustrated in FIGS. 1 through 3.

Turbine 1, illustrated in FIG. 1, of an exhaust-gas turbocharger for an internal combustion engine, e.g., a diesel internal combustion engine or a spark ignition engine for a commercial vehicle or a passenger car, includes a turbine wheel 2 which is driven by exhaust gases of the internal combustion engine that are under overpressure, and which, via a connection shaft, drives a compressor of the exhaust-gas turbocharger that draws in and compresses combustion air to an increased charge-air pressure or boot pressure that is supplied to the cylinder inlet of the internal combustion engine. Turbine 1 also includes a flow channel 3 which surrounds turbine wheel 2 radially and semi-axially and has a radial flow-inlet cross-section 3a and a semi-axial flow-inlet cross-section 3b to turbine wheel 2. A radial guide baffle 5 having adjustable guide vanes 6 is located in radial flow-inlet cross-section 3a. This radial guide baffle 5 forms a variable turbine geometry. A semi-axial guide baffle 4 having stationary guide vanes is arranged in semi-axial flow-inlet cross-section 3b.

The variable turbine geometry may be adjusted in its position by an allocated control element depending on the operating mode of the internal combustion engine, the corresponding flow-inlet cross-section thereby being altered. In the exemplary embodiment illustrated, provision is made in the functioning drive operating mode to shift guide vanes 6 of radial guide baffle 5 into an open position to permit the greatest possible mass rate of flow through turbine 1 and to generate a high supercharger output. To generate engine braking power, on the other hand, radial guide baffle 5 is moved by a corresponding adjustment of guide vanes 6 into a damming or blocking position with reduced cross-section, in particular with a radial flow-inlet cross-section 3a reduced to zero. The exhaust gas supplied via flow channel 3 from the exhaust-gas outlet of the internal combustion engine is now forced to flow for the most part or completely via semi-axial flow-inlet cross-section 3b and semi-axial guide baffle 4 arranged there, onto turbine wheel 2. Because the total flow cross-section is reduced compared to the functioning or drive operating mode, an increased exhaust backpressure builds up in the exhaust-gas tract upstream of the turbine. At the same time, an overpressure is produced in the intake tract. In engine braking operation, brake valves at the cylinder outlet of the internal combustion engine are opened. The air compressed in the cylinders may be exhausted against the increased exhaust backpressure in the exhaust-gas tract.

Arranged in flow channel 3 of turbine 1 is a flow ring 7 that limits both radial flow-inlet cross-section 3a and semi-axial flow-inlet cross-section 3b. Flow ring 7 is axially displaceable in the exhaust-gas turbocharger. The axial displaceability is indicated by double arrow 8. Flow ring 7 includes an outer ring 9 and an inner ring 10, between which semi-axial guide baffle 4 is fixedly disposed. The radially inner side of inner ring 10 is acted upon by a housing-mounted sealing ring 11 that is accommodated in a groove of a housing component which is allocated to a bearing housing 12. Sealing ring 11 may be retained on a housing-mounted thermal shield 13 that is fixedly joined to bearing housing 12.

On the side facing flow ring 7, housing-mounted thermal shield 13 has two steps which form stops for axially displaceable flow ring 7 the inner ring 10 of which has a contour adapted to the steps. In FIG. 1, flow ring 7 is illustrated in its position abutting against radial guide baffle 5 without a gap. An axial shift out of this position is limited by the stops on housing-mounted thermal shield 13, flow ring 7 striking against the stops. Sealing ring 11 prevents incorrect air flow between flow ring 7 and radially inner, housing-mounted component 13 upon which flow ring 7 sits radially in the stop position.

In the position illustrated in FIG. 1, flow ring 7 abuts axially against the end face of radial guide baffle 5, forming a seal. No radial gap is formed, which means incorrect radial air flow may be prevented. In addition to radial guide baffle 5, spacer sleeves 14 which limit the axial shift of flow ring 7 in the direction of radial guide baffle 5 may also be arranged in radial flow-inlet cross-section 3a.

Adjustable guide vanes 6 of radial guide baffle 5 are rotationally mounted on shafts 15a and 15b, the two shafts 15a and 15b extending on axially opposite sides of the guide vanes, and first shaft 15a being housing-mounted, while second shaft 15b is accommodated in displaceable flow ring 7. Second shaft 15b is accommodated in a recess in flow ring 7, the depth of the recess corresponding at least to the shaft length, so that in the position of flow ring 7 abutting axially against radial guide baffle 5, a gap-free axial abutting may be ensured.

Adjustable guide vanes 6 are bordered axially on both sides by cover plates 16 and 17 which are accommodated in correspondingly formed recesses in the receiving housing-side component and on the facing side in flow ring 7, respectively.

The exemplary embodiment illustrated in FIG. 2 corresponds essentially to that illustrated in FIG. 1, however, with the difference that adjustable guide vanes 6 of radial guide baffle 5 have only a single housing-side shaft 15a. This example embodiment may provide that it is possible to dispense with recesses in flow ring 7 on the side facing guide vanes .6 for receiving a corresponding shaft piece. Two cover plates 16 and 17 on both axial sides of guide vanes 6 are also provided in the exemplary embodiment illustrated in FIG. 2.

In the exemplary embodiment illustrated in FIG. 3, guide vanes 6 of radial guide baffle 5 have only one housing-side shaft 15a, as well as only one cover plate 16 on the housing side.

Flow ring 7 and/or semi-axial guide baffle 4 and/or radial guide baffle 5 may be aerodynamically shaped, i.e., contoured to be favorable for the flow, in the manner that, due to the oncoming flow via flow channel 3, i.e., the radial and/or the semi-axial oncoming flow through radial and semi-axial flow-inlet cross-sections 3a and 3b, respectively, flow ring 7 experiences a resulting pressure force in the axial direction of the turbine wheel. The resulting pressure force may act upon flow ring 7 in the direction of radial guide baffle 5 in radial flow-inlet cross-section 3a, so that the axial end gap between the end face of radial guide baffle 5 and flow ring 7 is closed. The aerodynamic design of radial guide baffle 5 may be achieved by the construction and the positions of the guide vanes on the radial guide baffle.

However, it may also be possible for the flow ring to be acted upon in the direction of an end gap becoming larger, in order to prevent overspeeds.

What is claimed is:

1. An exhaust-gas turbocharger for an internal combustion engine, comprising:
    a turbine arranged in an exhaust-gas tract of the internal combustion engine and including a flow channel having a radial flow-inlet cross-section and a semi-axial flow-inlet cross-section, the turbine including a variable turbine geometry arranged to changeable adjust the radial flow-inlet cross-section and the semi-axial flow-inlet cross-section;
    a compressor driven by the turbine arranged in an intake tract of the internal combustion engine; and
    a flow ring arranged in a housing of the exhaust-gas turbocharger and configured to limit the radial flow-inlet cross-section and the semi-axial flow-inlet cross-section, a position of the flow ring in the housing variably adjustable.

2. The exhaust-gas turbocharger according to claim 1, wherein the flow ring is axially displaceable.

3. The exhaust-gas turbocharger according to claim 2, wherein a width of the radial flow-inlet cross-section is adjustable by an axial shift of the flow ring and is configured to be limited to at least one of a minimum and a maximum.

4. The exhaust-gas turbocharger according to claim 3, further comprising housing-mounted stops arranged to limit the axial shift of the flow ring.

5. The exhaust-gas turbocharger according to claim 3, further comprising spacer sleeves provided in the radial flow-inlet cross-section, the spacer sleeves arranged to provide the minimum axial width of the radial flow-inlet cross-section.

6. The exhaust-gas turbocharger according to claim 2, further comprising housing-mounted stops arranged to limit an axial shift of the flow ring.

7. The exhaust-gas turbocharger according to claim 2, wherein the flow ring is arranged to experience a pressure force in an axial direction of the turbine in accordance with at least one of radial and semi-axial oncoming flow.

8. The exhaust-gas turbocharger according to claim 7, wherein the pressure force is arranged in a direction of a radial guide baffle arranged in the radial flow-inlet cross-section.

9. The exhaust-gas turbocharger according to claim 1, wherein the semi-axial flow-inlet cross-section is formed by an outer ring of the flow ring and an inner ring of the flow ring.

10. The exhaust-gas turbocharger according to claim 9, further comprising a sealing ring arranged on a radially inner side of the inner ring and configured to provide a seal with respect to a housing-mounted component.

11. The exhaust-gas turbocharger according to claim 1, further comprising a radial guide baffle arranged in the radial flow-inlet cross-section, the radial guide baffle including adjustable guide vanes having cover plates arranged at at least one axial end face.

12. The exhaust-gas turbocharger according to claim 11, further comprising an axial shaft arranged to support the guide vanes in the radial guide baffle on the housing.

13. The exhaust-gas turbocharger according to claim 11, further comprising an axial shaft arranged to support the guide vanes in the flow ring.

14. The exhaust-gas turbocharger according to claim 1, further comprising a guide baffle arranged in the semi-axial flow-inlet cross-section and including stationary vanes.

* * * * *